(12) United States Patent
Xiao et al.

(10) Patent No.: US 8,737,913 B2
(45) Date of Patent: May 27, 2014

(54) METHODS AND SYSTEMS FOR PROVIDING A WIRELESS AUTOMOBILE KEY SERVICE

(75) Inventors: Hong Xiao, Acton, MA (US); Afshin Moshrefi, Newburyport, MA (US); Andre Turner, Belmont, MA (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 555 days.

(21) Appl. No.: 12/975,638

(22) Filed: Dec. 22, 2010

(65) Prior Publication Data
US 2012/0164989 A1    Jun. 28, 2012

(51) Int. Cl.
*H04B 5/00*    (2006.01)
(52) U.S. Cl.
USPC ...... 455/41.1; 455/41.2; 455/528; 455/456.1; 455/456.3; 455/558; 705/5; 701/2; 701/208
(58) Field of Classification Search
USPC ........................................ 455/411, 41.2, 41.1
See application file for complete search history.

(56) References Cited

U.S. PATENT DOCUMENTS

2011/0060480 A1*    3/2011    Mottla et al. ...................... 701/2

* cited by examiner

*Primary Examiner* — Charles Appiah
*Assistant Examiner* — Randy Peaches

(57) ABSTRACT

Systems and methods for providing a wireless automobile key service are disclosed. In one embodiment, a method includes detecting whether the mobile device is connected to the automobile over a first network, launching a wireless automobile key service application on the mobile device when it is detected that the mobile device is connected to the automobile over the first network, and receiving, via the application from an operator of the automobile using the mobile device, a request to issue a command to the automobile. The method further includes determining whether the requested command is a first command or a second command. The method further includes when the requested command is a first command, sending, from the mobile device to a server over a second network, a request to issue the first command to the automobile. The method also includes when the requested command is a second command, sending, from the mobile device to the sever over the second network, a request to issue the second command to the automobile, and receiving, at the mobile device from the server over the second network, status information associated with the automobile.

24 Claims, 10 Drawing Sheets

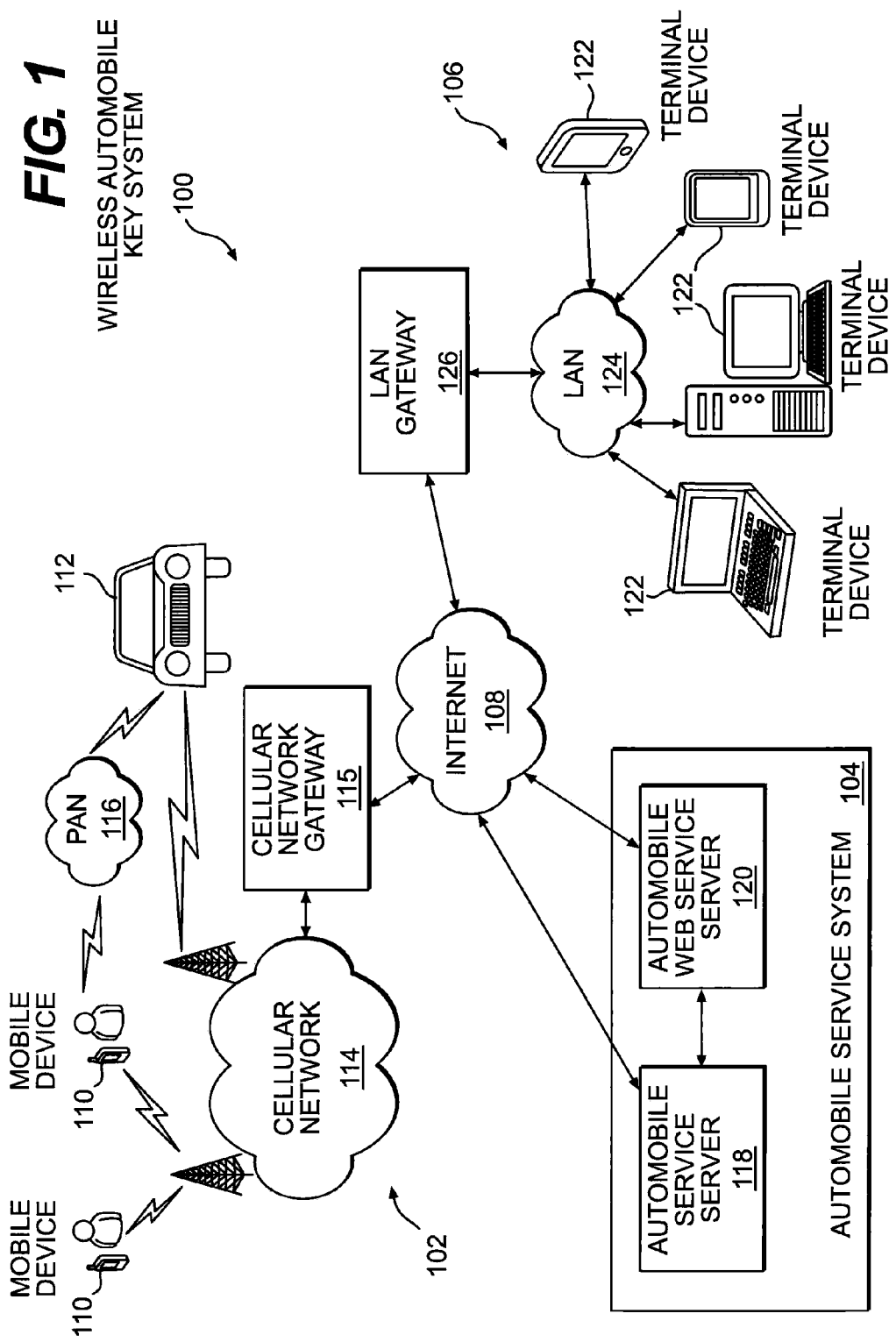

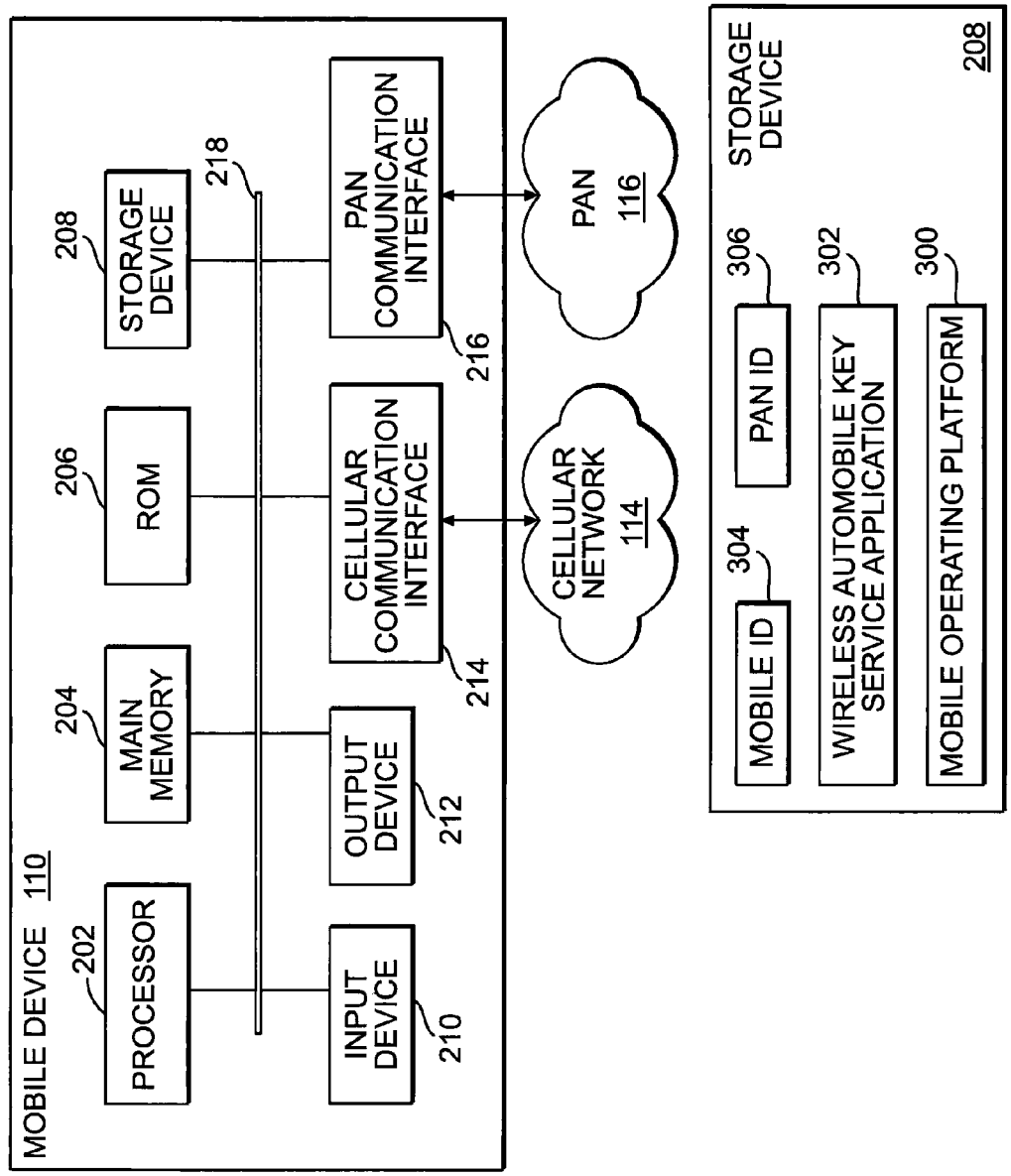

METHODS AND SYSTEMS FOR PROVIDING A WIRELESS AUTOMOBILE KEY SERVICE

BACKGROUND INFORMATION

In a remote "keyless" entry system for an automobile, the automobile operator usually carries an electronic "key" device along with the mechanical key for the automobile. The electronic key device has several buttons allowing the operator to perform different functions traditionally requiring the mechanical key. For example, the key device usually includes a button for locking the doors, a button for unlocking the doors, and a button for opening the trunk. Some electronic key devices also include a button for starting the engine of the automobile and a button for triggering/terminating an alarm condition of an alarm system on the automobile.

When a particular button is pressed, the electronic device emits a radio wave having a specific frequency. Based on the frequency, a controller onboard the automobile is able to discern and execute a requested command. Since radio waves are used, the operator can perform the various functions at a distance from the automobile (e.g., several meters). For example, the operator can start the automobile while still inside a building or can unlock the doors while walking through a parking lot to the automobile.

While conventional keyless entry systems are useful, they have certain drawbacks. For example, since the operator usually carries the electronic key with the mechanical key, electronic keys are not convenient in terms of reducing the number of items that must be carried when taking a trip in the automobile. Further, the mechanical key is usually lost when the electronic key is lost. And replacing the electronic key or the mechanical key is time-consuming, inconvenient, and expensive. Further, conventional keyless entry systems are limited in terms of their functionality.

This disclosure is directed to overcoming one or more of the problems set forth above, as well as other problems in the art.

BRIEF DESCRIPTION OF THE DRAWINGS

FIG. 1 illustrates an exemplary wireless automobile key system, consistent with the disclosed embodiments;

FIG. 2 illustrates an exemplary mobile device associated with the wireless automobile key system, consistent with the disclosed embodiments;

FIG. 3 illustrates an exemplary a storage device of the mobile device, consistent with the disclosed embodiments;

DETAILED DESCRIPTION

Figure 4:
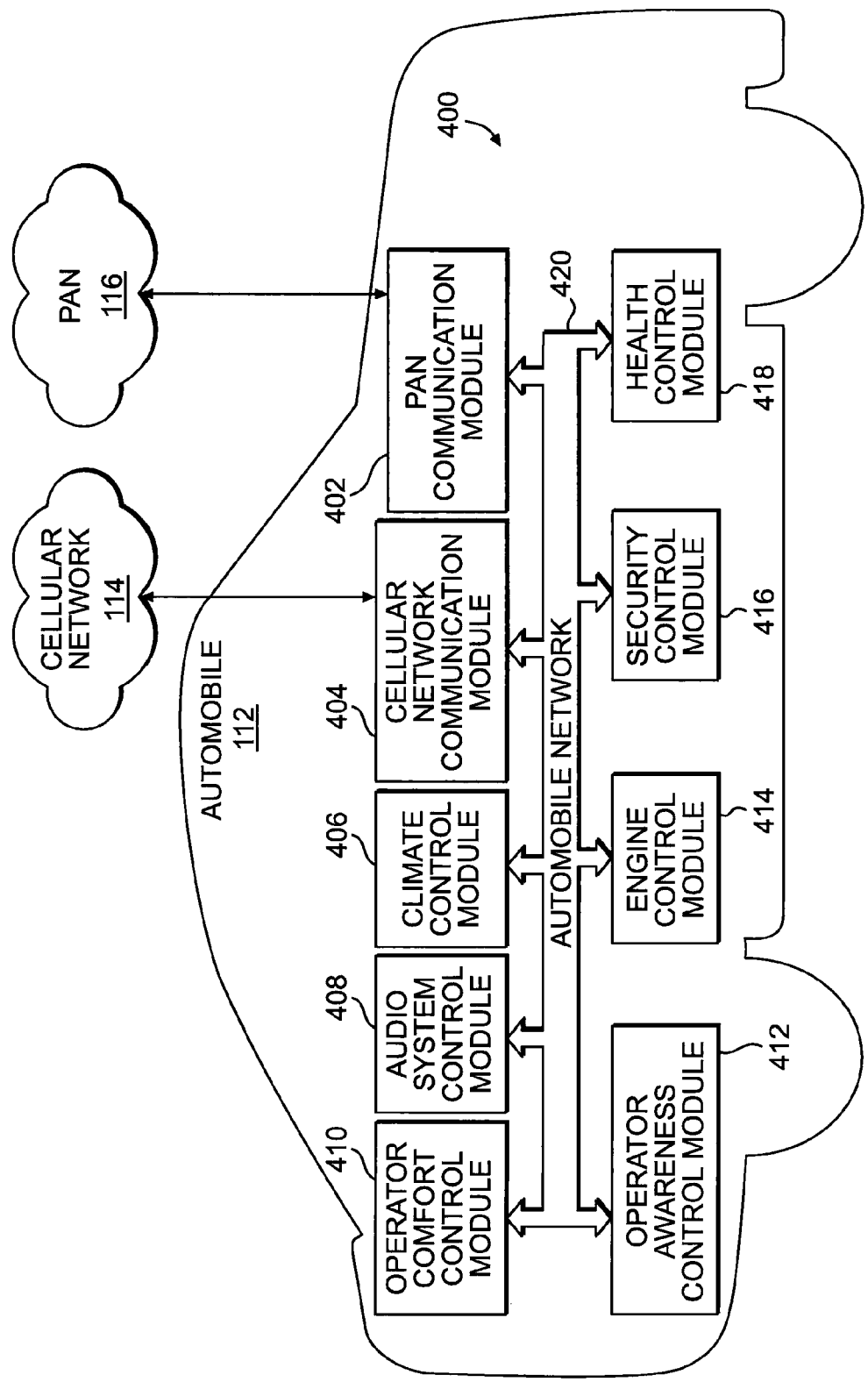
FIG. 4 illustrates an exemplary automobile configured for use in the wireless automobile key system, consistent with the disclosed embodiments.

Reference will now be made in detail to exemplary embodiments, examples of which are illustrated in the accompanying drawings. The following description refers to the accompanying drawings in which the same numbers in different drawings represent similar elements unless otherwise represented. The implementations set forth in the following description of exemplary embodiments do not represent all implementations consistent with the disclosure. Instead, they are merely examples of systems and methods consistent with aspects related to the disclosure as recited in the appended claims.

As used herein, automobile owner or operator means any person or other entity having a property interest, ownership interest, usage interest, possessory interest, custodial interest, or other interest in an automobile. The two terms are used interchangeably, and are merely intended to refer to any person or entity that may have a sufficient interest in the automobile to benefit from the disclosed automobile security monitoring system.

One aspect of the disclosure relates to a method for commanding an automobile using a mobile device. The method may include detecting whether the mobile device is connected to the automobile over a first network, launching a wireless automobile key service application on the mobile device when it is detected that the mobile device is connected to the automobile over the first network, and receiving, via the application from an operator of the automobile using the mobile device, a request to issue a command to the automobile. The method may also include determining whether the requested command is a first command or a second command. When the requested command is a first command, the method may include sending, from the mobile device to a server over a second network, a request to issue the first command to the automobile. And when the requested command is a second command, the method may include sending, from the mobile device to the sever over the second network, a request to issue the second command to the automobile, and receiving, at the mobile device from the server over the second network, status information associated with the automobile.

Another aspect of the disclosure relates to a method for commanding an automobile. The method may include connecting the automobile, a communication device, and a server via a network. The method may further include receiving, by the server over the network, a request from an operator of the automobile using the communication device to issue a command to the automobile. The method may also include determining whether the request is to issue a first automobile command or a second automobile command. When the request is to issue the first automobile command, the method may include sending, by the server over the network, the first automobile command to the automobile. And when the request is to issue the second automobile command, the method may include sending, by the server over the network, the second automobile command to the automobile, and sending, to the terminal device over the network, status information associated with the automobile.

Yet another aspect of the disclosure relates to an automobile system. The automobile system may include a personal area network (PAN) communication module on the automobile and configured to connect to a mobile device over a PAN. The system may further include a cellular network communication module on the automobile. The cellular network module may be configured to connect to a server over a cellular network, and to receive, from the server over the cellular network, an automobile command associated with a system onboard the automobile. In addition, the system may include a control module associated with the system onboard the automobile and configured to execute the automobile command.

FIG. 1 illustrates an exemplary wireless automobile key system 100, consistent with the disclosed embodiments. System 100 may be associated with an Internet service provider, a wireless service provider, a telecommunications service provider, a content service provider, or another entity that provides the disclosed wireless automobile key service. In another embodiment, system 100 may be associated with an automobile company that provides the disclosed wireless automobile key service.

In general, system 100 may provide a wireless automobile key service to one or more owners of one or more automobiles. In one embodiment, the owner or operator must have an account with system 100 to take advantage of the disclosed wireless automobile key security service. But other arrangements are contemplated. For example, the disclosed wireless automobile key service may be included as a feature of a particular automobile model, such as an upgraded security package.

System 100 enables an operator of an automobile to use the operator's mobile device, such as a cell phone, to lock/unlock the automobile, to power on/off the automobile, or to affect other automobile operations. System 100 may also communicate with the automobile, over a network, to apply automobile system settings based on preferences contained in an operator profile. In addition, system 100 may enable an operator of the automobile at a remote terminal, such as a desktop or laptop computer, to lock/unlock the automobile, to power on/off the automobile, or to perform other operations associated with the automobile over a network. System 100 may also enable the operator or owner to view health information associated with the vehicle, to view or change operator profile information for the automobile, or to perform other related functions. These and other functions of system 100 will be discussed in greater detail below.

As shown in FIG. 1, system 100 may include a mobile system 102, an automobile service system 104, and a local system 106 in communication over the Internet 108. Mobile system 102 may include one or more mobile devices 110 and one or more automobiles 112 configured to communicate on a cellular network 114. Mobile system 102 may also include a cellular network gateway 115 configured to facilitate communications between cellular network 114 and the Internet 108.

Mobile device 110 may be any type of mobile device configured to communicate over cellular network 114. For example, mobile device 110 may be a smartphone, a cell phone, a personal digital assistant (PDA), or other type of mobile device equipped to communicate voice and/or data with other mobile devices 110 over cellular network 114. Mobile device 110 may also communicate with one or more automobiles 112 over a personal area network (PAN) 116, such as Bluetooth® piconet or other network for communicating data over a short range.

FIG. 2 illustrates an exemplary mobile device 110, consistent with the disclosed embodiments. As shown in FIG. 2, mobile device 110 may include, for example, a processor 202, a main memory 204, a read-only memory (ROM) 206, a storage device 208, an input device 210, an output device 212, a cellular network communication interface 214, and a personal area network (PAN) communication interface 216 interconnected via a communications bus 218.

Processor 202 may include any general-purpose or special-purpose computer microprocessor configured to execute computer program instructions stored in main memory 204. Main memory 204 may include, for example, a random access memory (RAM) or other type of dynamic or volatile storage device. Main memory 204 may store information and instructions loaded from ROM 206 for execution by processor 202.

ROM 206 may be any static or non-volatile memory storage device configured to store computer program instructions for loading into main memory 204 and execution by processor 202. For example, ROM 206 may be a programmable read-only memory (PROM), such as an erasable programmable read-only memory (EPROM), an electronically erasable programmable read-only memory (EEPROM), a one-time programmable read-only memory (OTP), a field-programmable read-only memory (FPROM), or a flash memory device.

Storage device 208 may include any type of mass data storage device. For example, storage device 208 may include a magnetic data storage device, such as a hard drive. Alternatively or additionally, storage device 208 may include a solid-state drive (SSD). It is to be appreciated, however, that storage device 208 may embody any type of mass data storage device known in the art.

FIG. 3 shows an exemplary representation of information stored in storage device 208. As shown, storage device 208 may contain a mobile operating platform 300, a wireless automobile key service application 302, a mobile ID 304, and/or a PAN ID 306. Mobile operating system 300 may be any type of operating environment for a mobile computing device within which one or more mobile applications can execute. For example, mobile operating platform 300 may be the Nokia Symbian™ operating environment, the Apple IOS™ operating environment, the RIM Blackberry™ operating environment, the Google Android™ operating environment, the Windows Mobile™ operating environment, or another graphical operating environment configured to execute on a mobile computing device.

Automobile service application 302 may be an application configured to execute on mobile operating platform 300 to perform the disclosed wireless automobile key service. In one embodiment, mobile device 110 may download application 302 from automobile service system 104. For example, an operator of automobile 112 may register for the disclosed wireless automobile key service with automobile service system 104 and create an account for one or more mobile devices 110, automobile operators, and/or automobiles 112. After registering, application 302 may be downloaded to mobile device 110.

Mobile ID 304 may include any form of identification associated with mobile device 110. For example, mobile ID 304 may be a serial number, a network ID on cellular network 114, an identification of an owner or account holder of mobile device 110, or any other information used to identify mobile device 110.

PAN ID 306 may include any information used to identify mobile device 110 on PAN 116. For example, PAN ID 306 may be a Bluetooth device ID, a Bluetooth link key, or any other information used to identify mobile device 110 on PAN 116.

Returning to FIG. 2, input device 210 may include one or more mechanisms that permit a user to input information or commands to mobile device 110. For example, input device 210 may include a keyboard, a touch screen, a touch pad, a mouse, a pen, a voice recognition device, a biometric recognition device, a still camera, a video camera, an accelerometer, a microphone, or any other type of device for enabling user input to a computing device.

Output device 212 may include one or more mechanisms that output information to the user of mobile device 110. For example, output device 212 may include a display device, a speaker, a vibrating device, a lighting device or lamp, or any other type of device for providing output to a user of a computing device.

Cellular communication interface 214 may include any device or system enabling mobile device 110 to communicate over cellular network 114. For example, cellular communication interface 214 may include a radio antenna and/or transceiver for communicating voice and/or data over a $2^{nd}$ Generation (2G) cellular communication network, a $3^{rd}$ Generation (3G) cellular communication network, a $3^{rd}$ Generation Long Term Evolution (LTE) network, a $4^{th}$ Generation (4G) cellular communication network, or any other type of mobile wireless communication network 114 known in the art. In general, mobile device 110 may communicate with automobile service system 104, via cellular communication interface 214, in connection with the disclosed automobile services and/or functions.

PAN communication interface 216 may include any device or system enabling mobile device 110 to communicate over PAN 116. In one embodiment, PAN communication interface 216 may include a radio antenna and/or transceiver for communicating voice and/or data over short distances, such as 1-100 meters. For example, PAN communication interface 216 may be a Bluetooth® communication interface configured to communicate over short distances using low-energy, short wavelength radio waves (e.g., 2.4 GHz). PAN communication interface 216 may be configured to detect the presence of automobile 112 on PAN 116, to established a connection (e.g., "pair") with automobile 112 over PAN 116, and to communicate with automobile 112 over the PAN connection, consistent with the disclosed wireless automobile key service.

FIG. 4 illustrates an exemplary representation of an onboard automobile system 400, consistent with disclosed embodiments. As shown, in one embodiment, system 400 may include a personal area network (PAN) communication module 402, a cellular network communication module 404, a climate system control module 406, a radio system control module 408, an operator comfort system control module 410, an operator awareness system control module 412, an engine system control module 414, a security system control module 416, and a health system control module 418, interconnected by an automobile network 420. Automobile network 420 may be, for example, a controller area network (CAN) bus, an Ethernet network, or any other type of onboard automobile communication network known in the art.

In one embodiment, modules 402-418 may embody one or more computers onboard automobile 112 and configured to perform or control various automotive functions. For example, modules 402-408 may include electronic control units (ECU), such as application-specific integrated circuits (ASIC), field-programmable gate arrays (FPGA), or other types of computer processing devices known in the art. In other embodiments, however, modules 402-418 may be software modules of a computer program executing on an automobile computer.

PAN communication module 402 may be configured to control one or more communication devices of automobile 112 to communicate with mobile device 110 over PAN 116. For example, PAN communication module 402 may leverage a radio antenna and/or transceiver to communicate with mobile device 110 using Bluetooth protocol or another communications protocol for communicating data over short distances using low-energy, short-wavelength radio waves.

In one embodiment, PAN communication module 402 may be configured to connect to mobile device 110 over PAN 116. For example, PAN communication module 402 may be configured to detect the presence of mobile device 110 on PAN 116, to established a connection (e.g., "pair") with mobile device 110 over PAN 116, and to communicate with mobile device 110 over the PAN connection. For example, the owner of automobile 112 may pair PAN communication module 402 with the owner's mobile device 110 (e.g., according to Bluetooth protocol). Subsequently, PAN communication module 402 may periodically broadcast over PAN network 116 a beacon signal, which may be detected by mobile device 110. Alternatively, mobile device 110 may periodically broadcast a beacon signal on PAN 116, which may be detected by PAN communication module 402. In response to detecting the beacon, a communications session may be established between PAN communication module 402 and mobile device 110.

In certain embodiments, PAN communication module 402 may be configured to receive an automobile command from mobile device 110 over PAN 116 in connection with the disclosed wireless automobile key service. PAN communication module 402 may broadcast the command on automobile network 420 for execution by one or more of modules 406-418. For example, PAN communication module 402 may receive an engine start command from mobile device 100 over PAN 116. In response, PAN communication module 402 may generate and transmit an engine start command to engine control module 414 over automobile network 420. As another example, PAN communication module 402 may receive from mobile device 110 over PAN 116 an audio system settings command, an operator seat settings command, an operator mirror or camera settings command, or a door or trunk lock/unlock command. In response, PAN communication module 402 may generate and transmit corresponding commands over automobile network 402 to climate system control module 406, to audio system control module 408, to operator comfort system control module 410, to operator awareness system control module 414, and to security system control module 416, respectively.

In addition, PAN communication module 402 may be configured to receive a request for automobile health data from mobile device 110 over PAN 116. For example, PAN communication module 402 may receive a request for an automobile health report. In response, PAN communication module 402 may retrieve or request from health control module 418 over automobile network 420 automobile health information, such as battery charge level, fuel level, tire pressure, fluid levels (e.g., oil, transmission fluid, and power steering fluid), diagnostic alerts (e.g., low oil pressure), or any other automobile health or status information monitored by health control module 418 and/or broadcast on automobile network 420. PAN communication module 402 may generate a report based on the received health information, and may transmit the report over PAN network 116 to mobile device 110.

Cellular communication module 404 may be configured to control one or more communication devices of automobile 112 to communicate with over cellular network 114, in connection with the disclosed wireless automobile key service.

For example, cellular communication module 404 may include a radio antenna and/or transceiver for communicating data over a $2^{nd}$ Generation (2G) cellular communication network, a $3^{rd}$ Generation (3G) cellular communication network, a $3^{rd}$ Generation Long Term Evolution (LTE) network, a $4^{th}$ Generation (4G) cellular communication network, or any other type of cellular communication network 114 known in the art.

Cellular network communication module 404 may be configured to receive automobile commands from automobile service system 104. And, in response, cellular network communication module 404 may broadcast the automobile command on automobile network 420 for execution by one or more of modules 406-418. For example, cellular network communication module 404 may receive an engine power on/off command from automobile service system 104 over cellular network 114, in response to operator input to mobile device 110 and/or to a terminal device associated with local system 106. Cellular network communication module 404 may the generate and transmit an engine start command to engine system control module 414 over automobile network 420. Similarly, in response to operator input to mobile device 110 and/or to a terminal device associated with local system 106, cellular communication module 404 may receive from automobile service system 104 over cellular network 114 an audio systems settings command, an operator seat settings command, an operator mirror or camera settings command, or a door or trunk lock/unlock command. In response, cellular network communication module 404 may generate and transmit corresponding commands over automobile network 402 to climate system control module 406, to audio system control module 408, to operator comfort system control module 410, to operator awareness system control module 414, and to security system control module 416, respectively.

In addition, cellular network communication module 404 may be configured to receive a request for automobile health data from automobile service system 104. For example, in response to an owner of automobile 112 providing input to mobile device 110 and/or to a terminal device of local system 106, cellular communication module 404 may receive a request for an automobile health report from automobile service system 104. In response, cellular network communication module 404 may retrieve or request from health control module 418 over automobile network 420 automobile health information, such as battery charge level, fuel level, tire pressure, fluid levels (e.g., oil, transmission fluid, and power steering fluid), diagnostic alerts (e.g., low oil pressure), or any other automobile health or status information monitored by health control module 418 and/or broadcast on automobile network 420. Cellular network communication module 404 may then generate a report based on the received health information, and may transmit the report over cellular network 114 to automobile service system 104, to mobile device 110, and/or to the terminal device associated with local system 106.

Climate control module 406 may be configured to control one or more climate systems of automobile 112. For example, climate control module 406 may be configured to control a heating system, an air conditioning system, a defrosting system, or any other climate system of automobile 112.

Consistent with the disclosed embodiments, climate system control module 406 may control the climate systems based on automobile commands received from PAN communication module 402 and/or from cellular network communication module 404. For example, as described above, PAN communication module 402 or cellular network communication module 404 may transmit climate control commands on automobile network 420 in response to receiving commands over cellular network 114 or over PAN 116 from mobile device 110, from automobile service system 104, or from a terminal device associated with local system 106. The climate control commands may include, for example, a command to set desired heating temperature, a desired cooling temperature, a desired air conditioning setting, a desired vent setting, a desired fan speed setting, a desired window or mirror defroster setting, and/or other desired automobile climate settings associated with an operator profile. Upon receiving a command, climate system control module 406 may control the onboard climate systems to achieve the commanded settings.

Audio system control module 408 may be configured to control an audio system of automobile 112. For example, audio system control module 408 may be configured to control a radio, a CD player, a DVD player, an amplifier, a receiver, or any other audio device of automobile 112. Consistent with the disclosed embodiments, audio system control module 408 may control the audio system in response to commands received from PAN communication module 402 and/or from cellular network communication module 404. For example, as described above, PAN communication module 402 or cellular network communication module 404 may transmit audio system control commands on automobile network 420 in response to receiving commands over cellular network 114 or over PAN 116 from mobile device 110, from automobile service system 104, or from a terminal device associated with local system 106. Exemplary audio system control commands include a command to set desired station presets (e.g., AM, FM, or satellite station presets), to set a desired input source (e.g., AM radio, FM radio, satellite radio, CD player, or auxiliary input), to set a desired volume, to set a desired radio station or track, to set desired audio equalizer settings (e.g., bass, midrange, treble), to set a desired audio profile (e.g., surround sound, concert, live, rock, jazz, etc.), or to set any other parameter associated with the audio system of automobile 112. In one embodiment, the audio system setting commands may be based on an operator profile. Upon receiving a command, audio system control module 408 may control the audio system to achieve the commanded settings.

Operator comfort control module 410 may be configured to control an operator comfort system of automobile 112. For example, operator comfort control module 410 may control a seat positioning system, a seat heating system, a seat cooling or ventilation system, a grip heating system, or any other operator or passenger comfort devices associated with automobile 112. Consistent with the disclosed embodiments, operator comfort system control module 410 may control the comfort system in response to commands received from PAN communication module 402 and/or from cellular network communication module 404. For example, as described above, PAN communication module 402 or cellular network communication module 404 may transmit comfort system control commands on automobile network 420 in response to receiving commands over cellular network 114 or over PAN 116 from mobile device 110, from automobile service system 104, or from a terminal device associated with local system 106. Exemplary comfort system control commands include a command to set a desired seat backrest angle, to set a desired seat cushion angle, to set a desired seat fore-and-aft position, to set a desired headrest angle, to set a desired headrest height, to set a desired lumbar position, to set a desired seat depth/height, to set a desired seat heating/cooling temperature, to set a desired set ventilation parameter, or to set a desired grip temperature. In one embodiment, the comfort setting commands may be based on an operator profile. Upon receiving a command, operator comfort system control module 410 may control the comfort system to achieve the commanded settings.

Operator awareness system control module 412 may be configured to control parameters of one or more operator awareness devices of automobile 112. For example, operator awareness system control module 412 may control a mirror positioning device, camera positioning device, or any other operator awareness device associated with automobile 112. Consistent with the disclosed embodiments, operator awareness system control module 412 may control the parameters of the awareness devices in response to commands received from PAN communication module 402 and/or from cellular network communication module 404. For example, as described above, PAN communication module 402 or cellular network communication module 404 may transmit awareness system control commands on automobile network 420 in response to receiving commands over cellular network 114 or over PAN 116 from mobile device 110, from automobile service system 104, or from a terminal device associated with local system 106. Exemplary operator awareness system control commands include a command to set a rearview mirror position, to a side mirror position, or to set a reverse camera position. In one embodiment, the operator awareness command settings may be based on an operator profile. Upon receiving a command, operator awareness system control module 412 may control the comfort system to achieve the commanded settings.

Engine system control module 414 may be configured to control one or more parameters of an engine or other power source associated with automobile 112. In one embodiment, engine system control module 414 may be configured to power on/off the engine or other power source of automobile 112 in response to commands received from PAN communication module 402 and/or from cellular network communication module 404. For example, as described above, PAN communication module 402 or cellular network communication module 404 may transmit an engine power on/off command on automobile network 420 in response to receiving a command over cellular network 114 or over PAN 116 from mobile device 110, from automobile service system 104, or from a terminal device associated with local system 106. Upon receiving a command, engine system control module 414 may control the engine or other power source of automobile 112 to achieve the commanded setting.

Security system control module 416 may be configured to control one or more security devices associated with automobile 112. In one embodiment, security system control module 416 may be configured to set or unset an alarm system or alarm condition of automobile 112, or to lock/unlock a door or trunk of automobile 112, in response to commands received from PAN communication module 402 and/or from cellular network communication module 404. For example, as described above, PAN communication module 402 or cellular network communication module 404 may transmit a command to lock/unlock the doors on automobile network 420 in response to receiving commands over cellular network 114 or over PAN 116 from mobile device 110, from automobile service system 104, or from a terminal device associated with local system 106. In other embodiments, PAN communication module 402 or cellular network communication module 404 may similarly transmit commands to enable or disable an alarm state of an alarm system of automobile 112. Upon receiving a command, security system control module 416 may control the security device of automobile 112 to achieve the commanded setting.

Health control module 418 may be configured to monitor the health or status systems of automobile 112. For example, health control module 418 may monitor fluid levels, such as oil level, fuel level, power steering fluid level, transmission fluid level, windshield wiper fluid level, and water or coolant level. Health control module 418 may also monitor temperatures and pressures associated with automobile 112, such as oil temperature, oil pressure, tire pressure, engine temperature, and coolant temperature. Health control module 418 may also monitor a charge level of a battery. Health control module 418 may also monitor any diagnostic alerts or faults associated with automobile 112, such as check engine conditions, low oil pressure conditions, or low fuel conditions.

In some embodiments, health control module 418 may compile the monitored automobile health information to generate an automobile health log, which may be stored in an associated memory. Health control module 418 may also transmit the report on automobile network 420 in response to a request received from PAN communication module 402 or from cellular network communication module 404. As described above, PAN communication module 402 or cellular network communication module 404 may transmit a request for an automobile health report on automobile network 420 in response to receiving a command over cellular network 114 or over PAN 116 from mobile device 110, from automobile service system 104, or from a terminal device associated with local system 106. Accordingly, upon receiving a command, health system control module 418 may provide an automobile health report to PAN communication module 402 and/or to cellular network communication module 404.

Returning to FIG. 1, cellular network 114 may include any combination of components or systems for wirelessly communicating data. For example, cellular network 114 may include one or more base station antennas, switches, routers, amplifiers, repeaters, subscriber nodes, and/or other network communication devices. In one embodiment, cellular network 114 may be a $4^{th}$ Generation (4G) cellular network. In other embodiments, cellular network 114 may be a $2^{nd}$ Generation (2G) cellular communication network, a $3^{rd}$ Generation (3G) cellular communication network, a $3^{rd}$ Generation Long Term Evolution (LTE) network, or any other type of cellular communication network 114 known in the art. Cellular network 114 may also communicate voice or data using Internet Protocol (IP) or other packet-switched protocols.

Cellular network gateway 115 may include any device capable of acting as an interlace between cellular network 114 and the Internet 108. Cellular network gateway 115 may convert messages having cellular network protocols into messages having IP-compatible protocols or other packet-switched protocols. Cellular network gateway 115 may further implement protocols such as session initiation protocol (SIP) when making data available to the Internet 108. In one embodiment, cellular network gateway 115 may receive automobile commands from the Internet 108, convert the commands for communication on cellular network 114, and transmit the converted automobile commands on cellular network 114. The converted commands may then be received at automobile 112 from cellular network 114 via cellular network communication interface 214. Alternatively or additionally, the converted commands may be received at mobile device 110 and relayed from mobile device 110 to automobile 112 over PAN 116. Similarly, cellular network gateway 115 may receive data transmitted on cellular network 114, convert the data for communication on the Internet 108, and transmit the converted data on the Internet 108.

PAN 116 may be any wireless network configured to communicate data over a short distance, such as within a personal space or area. In one embodiment, PAN 116 may be a Bluetooth piconet configured to communicate data over short distances using radio waves having short wavelengths. It is to be appreciated however, PAN 116 may embody any type of wireless network for communicating data over short distances (e.g., an infrared signaling network).

Automobile service system 104 may represent computing infrastructure associated with an Internet service provider, a wireless service provider, a telecommunications service provider, a content service provider, or other entity that provides the disclosed wireless automobile key service. In one embodiment, automobile service system 104 may include an automobile service server 118 and an automobile web service server 120.

Server 118 may embody a server computer, a network of server computers (e.g., distributed grid computers), a mainframe computer, or any other computing system for storing data and responding to requests for stored data over a network. Generally, server 118 may maintain automobile account information associated with customers of the disclosed wireless automobile key service. In response to requests received from automobile operators at mobile devices 110 and/or at terminal devices associated with local system 106, server 118 may provide various automobile commands or provide various automobile-related information.

Figure 5:
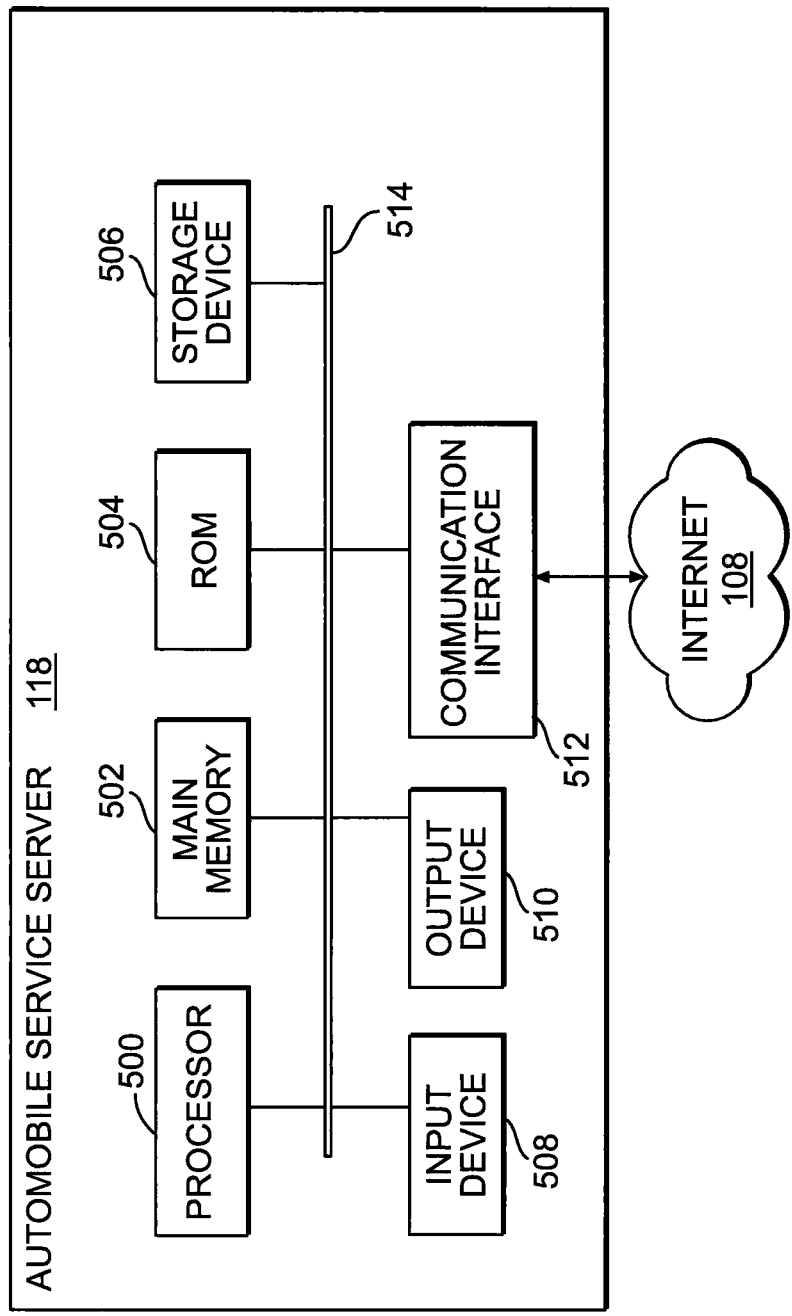
FIG. 5 illustrates an exemplary automobile service server of the wireless automobile key system, consistent with the disclosed embodiments.

FIG. 5 illustrates an exemplary representation of automobile service server 118. As shown, server 118 may include, for example, a processor 500, a main memory 502, a read-only memory (ROM) 504, a storage device 506, an input device 508, an output device 510, and a communication interlace 512 interconnected via a communications bus 514.

Processor 500 may include any general-purpose or special-purpose computer microprocessor configured to execute computer program instructions stored in main memory 502. Main memory 502 may include, for example, a random access memory (RAM) or other type of dynamic or volatile memory storage device. Main memory 502 may store information and instructions loaded from ROM 504 for execution by processor 500 to perform the disclosed processes.

ROM 504 may be any static or non-volatile memory storage device configured to store computer program instructions to be loaded into main memory 502 and executed by processor 500 to perform the disclosed processes. For example, ROM 504 may be a programmable read-only memory (PROM), such as an erasable programmable read-only memory (EPROM), an electronically erasable programmable read-only memory (EEPROM), a one-time programmable read-only memory (OTP), a field-programmable read-only memory (FPROM), or a flash memory device.

Storage device 506 may include any type of mass data storage device. For example, storage device 506 may include a magnetic data storage device, such as a hard drive. Alternatively or additionally, storage device 506 may include a solid-state drive (SSD). In other embodiments, storage device 506 may include a optical storage drive, such as a CD-ROM or DVD-ROM. It is to be appreciated, however, that storage device 506 may embody any type of mass data storage device known in the art.

Figure 6:
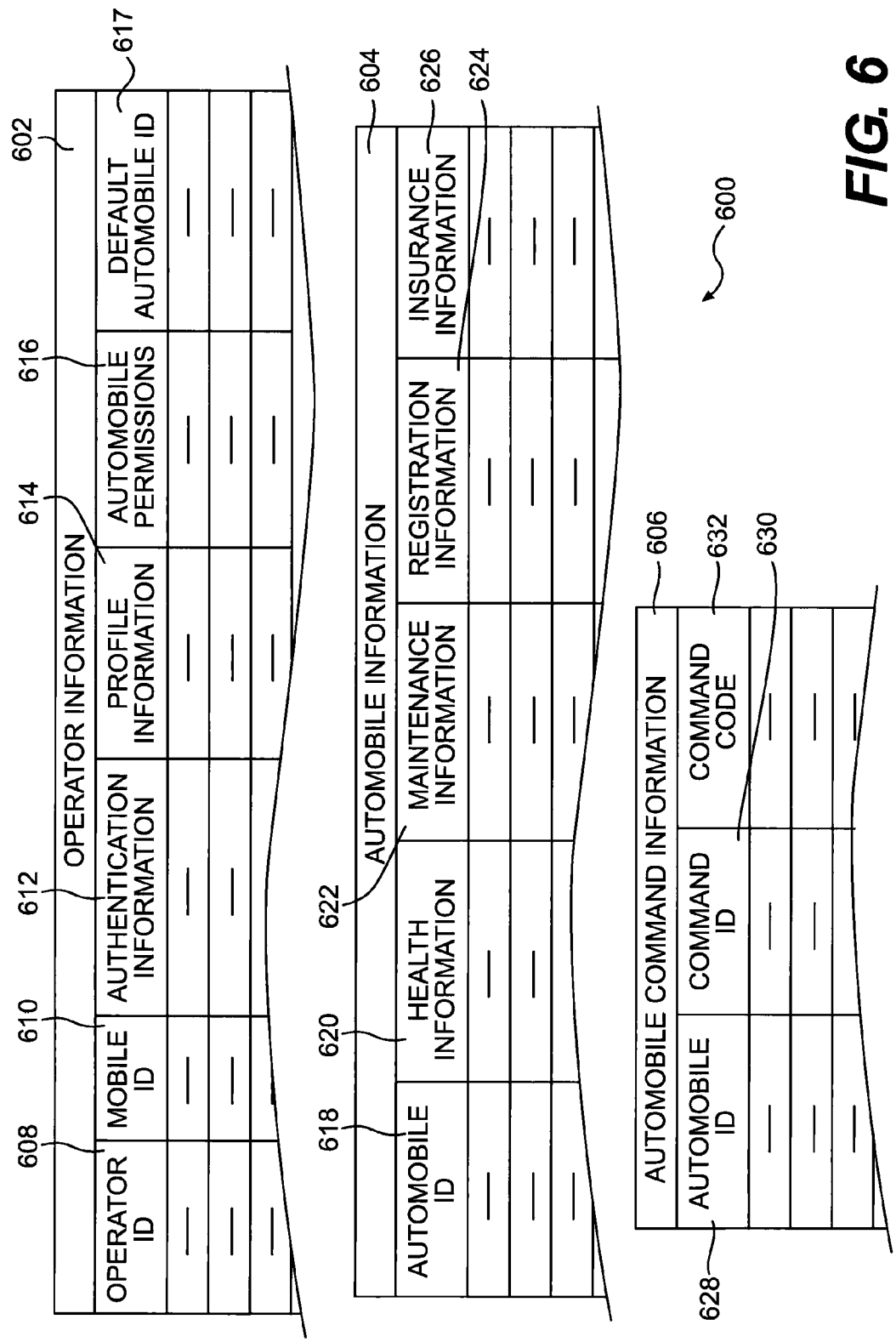
FIG. 6 illustrates exemplary information stored by the automobile service server, consistent with the disclosed embodiments.

FIG. 6 shows an exemplary representation of wireless automobile key service information 600 stored in storage device 506. In one embodiment, wireless automobile key service information 600 may include operator information 602, automobile information 604, and/or other account information. As discussed above, an owner or operator of automobile 102 may register for the disclosed wireless automobile key service by creating an account with automobile service system 104. Although FIG. 6 may show wireless automobile key service information 600 for one account, it is to be appreciated that storage device 506 may contain automobile key service information 600 for a plurality accounts, each associated with one or more automobiles 112, one or more automobile operators, and/or one or more mobile devices 110.

Operator information 602 may contain information about each automobile operator on the wireless automobile key service account. For example, operator information 602 may contain an operator ID 608, a mobile ID 610, operator authentication information 612, operator profile information 614, automobile permissions information 616, and a default automobile ID 617. Operator ID 608 may include the name of the operator, the operator's user name for the account, a social security number of the operator, or any other information identifying the operator.

Mobile ID 610 may be associated with each operator on the wireless automobile key service account. Mobile ID 610 may be a serial number associated with the mobile device 110 of the operator, a network ID associated with mobile device 110 of the operator, or any other information that identifies the particular mobile device 110 associated with the operator.

Authentication information 612 may be associated with each operator on the wireless automobile key service account. Authentication information 612 may include an account password, biometric data, or other information that can be used to authenticate the operator to the wireless automobile key service account.

Operator profile information 614 may be associated with each operator on the wireless automobile key service account. Operator profile information 614 may contain information regarding the preferences of the operator for the disclosed wireless automobile key service. For example, operator profile information 614 may contain climate control system preferences for the operator for each automobile 112 on the account. As an example, the climate control preferences may include the operator's desired heating or cooling temperature settings, desired air conditioning settings, desired vent settings, desired fan speed settings, desired window or mirror defroster settings, and/or other climate preferences for the automobile(s) 112.

Operator profile information 614 may also contain audio system preferences for the operator for each automobile 112 on the account. The audio system preferences may include, for example, the operator's desired station presets (e.g., AM, FM, or satellite station presets), desired input source (e.g., AM radio, FM radio, satellite radio, CD player, or auxiliary input), desired volume, desired radio station or track, desired audio equalizer settings (e.g., bass, midrange, treble), desired audio profile (e.g., surround sound, concert, live, rock, jazz, etc.), or other audio system preferences for the automobile(s) 112.

Operator profile information 614 may also contain operator comfort system preferences for the operator for each automobile 112 on the account. The comfort preferences may include, for example, the operator's desired seat backrest angle, desired seat cushion angle, desired seat fore-and-aft position, desired headrest angle, desired headrest height, desired lumbar position, a desired seat depth/height, desired seat heating/cooling temperature, desired seat air circulation setting, desired grip temperature, or other comfort preferences for the automobile(s) 112.

Operator profile information 614 may also contain operator awareness system preferences for the operator for each automobile 112 on the account. The operator awareness preferences may include, for example, the operator's desired rearview mirror positioning, desired side view mirror positioning, desired reverse camera positioning, or other awareness preferences for the automobile(s) 112.

Operator profile information 614 may also contain engine system preferences for the operator for each automobile 112 on the account. The engine system preferences may include, for example, information indicating whether the operator prefers to automatically wirelessly start the engine of the automobile 112 using the disclosed wireless automobile key service.

Operator profile information 614 may also contain security system preferences for the operator for each automobile 112 on the account. The security system preferences may indicate, for example, whether the operator prefers to automatically wirelessly unlock one or more doors or the trunk of the automobile 112 using the disclosed wireless automobile key service.

Operator profile information 614 may be set by the operator using the automobile service application 302 on mobile device 110. For example, application 302 may provide a page allowing the operator to set, configure, or modify the operator's profile information 614 using mobile device 110. Alternatively or additionally, operator profile information 614 may be set by the operator at a terminal device associated with local system 106. For example, the operator may access a web page provided by automobile web service server 120 allowing the operator to set, configure, or modify the operator's profile information 614.

Operator information 602 may further include automobile permissions 616 associated with each operator on the account. In one embodiment, automobile permissions 616 may identify the automobile(s) 112 the operator is permitted to operate in connection with the disclosed wireless automobile key service. For example, in a family account, the father and mother may have permission to operate every automobile 112 on the account. Whereas a child may only have permission to operate the child's automobile 112 or the family automobile 112.

Operator information 602 may further include a default automobile ID 617 associated with each operator on the account. Default automobile ID 617 may identify, for each operator, a default automobile 112 for which to provide the disclosed wireless automobile key service. In other words, default automobile ID 617 may identify an automobile 112 assigned to the operator for purposes of providing the disclosed wireless automobile key service. Default automobile ID 617 may include a vehicle identification number (VIN) associated with the default automobile 112, information regarding the manufacturer, the year of manufacture, and the model of the default automobile 112, and/or any other information that may be used to identify the default automobile 112 for which to provide the disclosed service for the operator.

Automobile information 604 may contain information about each automobile 112 on the wireless automobile key service account. For example, automobile information may contain an automobile ID 618. Automobile ID 618 may include a vehicle identification number (VIN) associated with the automobile 112, information regarding the manufacturer, the year of manufacture, and the model of the automobile 112, and/or any other information that may be used to identify the automobile 112.

In some embodiments, the operator may set operator profile information 614 from automobile 112. For example, the operator may set the automobile climate, audio system settings, seat positioning, mirror and/or camera positioning, etc. Automobile 112 may communicate the settings over cellular network 114 to server 118, which may update the stored operator profile information 614 for the operator.

Automobile information 604 may also contain health information 620 associated with each automobile 112 on the wireless automobile key service account. Health information 620 may contain, for example, information indicating the current fuel level, battery charge level, tire pressure, fluid levels (e.g., oil, transmission fluid, and power steering fluid), diagnostic alerts (e.g., low oil pressure), or any other monitored health or status information associated with the automobile 112.

In one embodiment, server 118 may periodically request an automobile health report from automobiles 112 over the Internet 108. In response to receiving the request at the automobile 112 over cellular network 114, cellular network communication module 404 may request an automobile health report from health control module 418. Upon receiving the health report, cellular network communication module 404 may transmit the health report to server 118 over cellular network 114. Server 118 may use the received health report to update the health information 620 corresponding to the automobile 112.

Automobile information 604 may further include maintenance information 622 associated with each automobile 112 on the wireless automobile key service account. Maintenance information 622 may contain information regarding the prior maintenance history of the automobile 112. For example, maintenance information 622 may identify past maintenance performed on the automobile 112 and the time/date on which the maintenance was performed (e.g., oil change, Dec. 6, 2010). In some embodiments, maintenance information 622 may also include a schedule of required or recommendation maintenance for the automobile 112. Maintenance information 622 may be input by the operator via mobile device 110 or via a terminal device of local system 106 (e.g., using the website). In other embodiments, automobile service server 118 may download or receive maintenance information 622 over the Internet 108, for example, from a computing system associated with a shop that performed the maintenance.

Automobile information 604 may further include registration information 624 associated with each automobile 112 on the wireless automobile key service account. Registration information 624 may contain information regarding the registration of the automobile 112 in a state or other jurisdiction. For example, registration information 624 may contain information identifying the state in which the automobile 112 is registered, as well as the valid start date and expiration date of the registration. Registration information 624 may be input by the operator via mobile device 110 or via a terminal device of local system 106 (e.g., using the website). In other embodiments, automobile service server 118 may download or receive registration information 624 over the Internet 108, for example, from a computing system associated with the department of motor vehicles in the jurisdiction in which the automobile 112 is registered.

Automobile information 604 may further include insurance information 626 associated with each automobile 112 on the wireless automobile key service account. Insurance information 626 may contain information regarding the insurance policy of the automobile 112. For example, insurance information 626 may contain information identifying the insurer of the automobile 112, as well as the valid start date and expiration date of the insurance. Insurance information 626 may be input by the operator via mobile device 110 or via a terminal device of local system 106 (e.g., using the website). In other embodiments, automobile service server 118 may download or receive insurance information 626 over the Internet 108, for example, from a computing system associated with the insurer of the automobile 112.

Automobile command information 606 may be a library of commands that may be issued to automobiles 112 associated with a wireless automobile key service account. As mentioned above, server 118 may issue various commands to an automobile 112 over the Internet 108. The commands may be issued in response to input from an operator at mobile device 110 or at a terminal device associated with local system 106. Automobile command information 606 may store information regarding such commands for access and retrieval by server 118. For example, automobile command information 606 may include climate control commands (e.g., power on/off commands, temperature setting commands, fan setting commands, vent setting commands, etc.); audio system commands (e.g., power on/off commands, volume setting commands, radio setting commands, audio profile setting commands, station preset assignment commands, etc.); operator comfort system commands (e.g., seat positioning commands, seat heating/cooling commands, grip heating commands, etc.); operator awareness system commands (e.g., rearview mirror positioning commands, side mirror positioning commands, reverse camera positioning commands, etc.); engine system commands (e.g., engine power on/off commands); security system commands (e.g., door or trunk lock/unlock commands; alarm system activation/deactivation commands, etc.); and/or other types of commands for a variety of types automobiles 112 made by different manufacturers.

In one embodiment, command information 606 may include an automobile ID 628 associated with the automobile 112. Automobile ID 628 may include a vehicle identification number (VIN) associated with the automobile 112; information regarding the manufacturer, the year of manufacture, and the model of the automobile 112; and/or any other information that may be used to identify the automobile 112.

Command information 606 may further include a command ID 630 for each command that may be issued to the automobile 112. Command ID 630 may be a name of the command, a reference number associated with the command, or other information that may be used to identify a particular automobile command.

Command information 606 may further include a command code 632 associated with each command that may be issued to the automobile 112. In one embodiment, command code 632 may be a specific code or instruction that may be broadcast on automobile network 420 and executed by a module 402-418 aboard the automobile 112 to cause the module 402-418 to perform the desired function. For example, command codes 632 may be CAN bus codes or other codes provided by the manufacturer of automobile 112 and/or the manufacturer of the automobile systems for controlling the systems to perform various functions. In one embodiment, server 118 may look up a particular command code 632 based on the automobile ID 628 and command ID 630 contained in a command request received from mobile device 110 and/or from a terminal device associated with local system 106

Returning to FIG. 5, input device 508 may include one or more mechanisms that permit a user to input information or commands to server 118. For example, input device 508 may include a keyboard, a touch screen, a touch pad, a mouse, a pen, a voice recognition device, a biometric recognition device, a still camera, a video camera, an accelerometer, a microphone, or any other type of device for enabling user input to a computing device.

Output device 510 may include one or more mechanisms that output information to the user of server 118. For example, output device 510 may include a printer, a speaker, a display, or any other type of device for providing output to a user of a computing device. Communication interface 512 may include any device or system enabling server 118 to communicate over the Internet 108.

Figure 7:
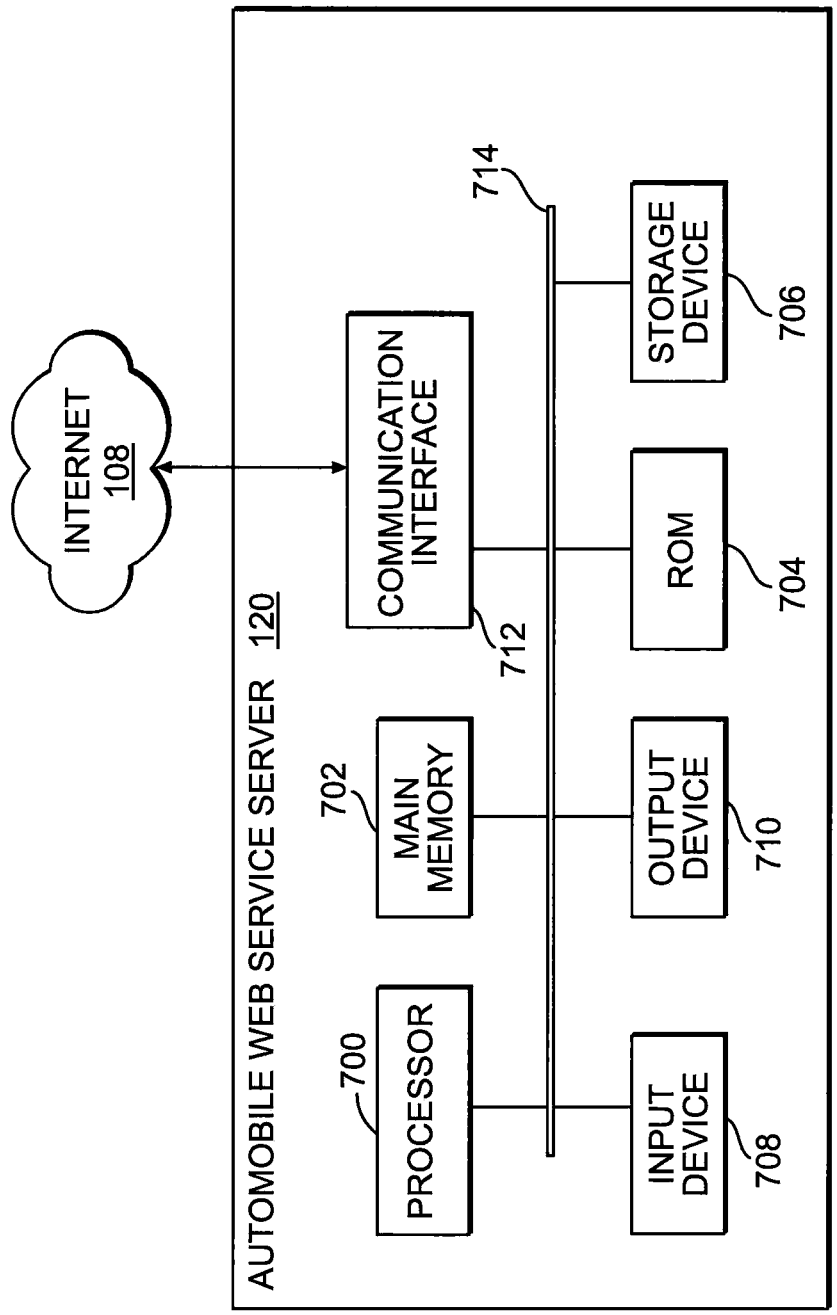
FIG. 7 illustrates an exemplary automobile web service server of the wireless automobile key system, consistent with the disclosed embodiments.

FIG. 7 illustrates an exemplary representation of automobile web service server 120. Automobile web service server 120 may have a similar configuration as automobile service server 118, discussed above. For example, automobile web service server 120 may include a processor 700, a main memory 702, a read-only memory (ROM) 704, a storage device 706, an input device 708, an output device 710, and a communication interface 712 interconnected via a communications bus 714. Storage device 706 may contain a wireless automobile key service website, which server 120 may serve to terminal devices of local system 106 in response to access requests received therefrom. The website will be discussed in more detail below.

Returning to FIG. 1, local system 106 may include one or more terminal devices 122 on a local area network (LAN) 124. In addition, local system 106 may include a LAN gateway 126 which interfaces between LAN 124 and the Internet 108.

Figure 8:
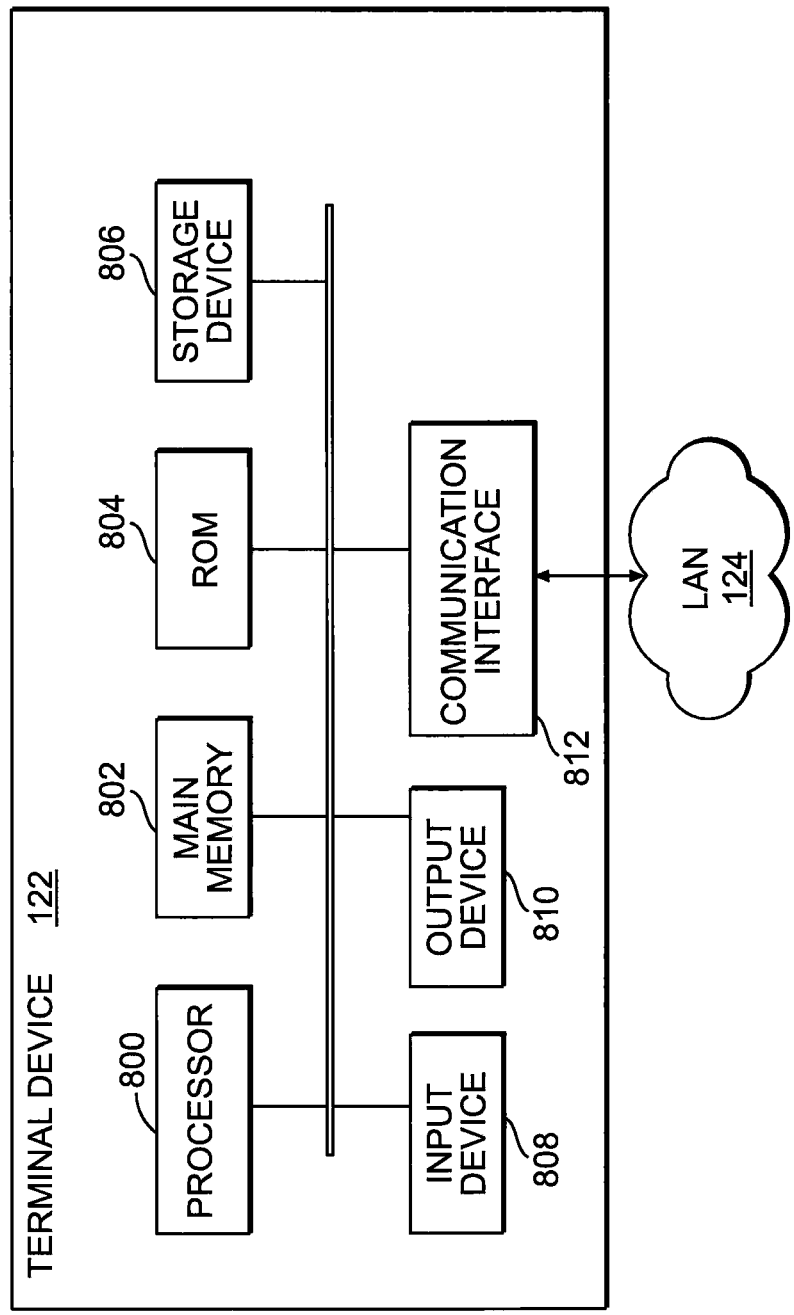
FIG. 8 illustrates an exemplary terminal device associated with the wireless automobile key system, consistent with the disclosed embodiments.

Terminal devices 122 may include a desktop computer, a laptop computer, a tablet PC, a personal digital assistant (PDA), an iPad®, or any other computing device that may connect to LAN 124 to access the Internet 108. In one embodiment, terminal devices 122 may be associated with the operators of automobiles 112. FIG. 8 shows an exemplary representation of terminal device 122. Similar to the other devices discussed above, terminal device 122 may include a processor 800, a main memory 802, a ROM 804, a storage device 806, an input device 808, an output device 810, and a communication interface 802 for communicating on LAN 124.

LAN 124 may include any device or system capable of providing local area connectivity to wired or wireless communication devices, such as terminal devices 122. For example, wireless LAN 124 may operate according to a wireless fidelity (Wi-Fi) protocol such as IEEE 802.11 wireless protocol. LAN gateway 126 may include any device or system capable of connecting LAN 124 to the Internet 108. For example, LAN gateway may include network hardware such as wireless routers, access points, switches, network address translators (NATs), or other network communication devices for providing a wired or wireless link between LAN 124 and the Internet 108.

Figure 9:
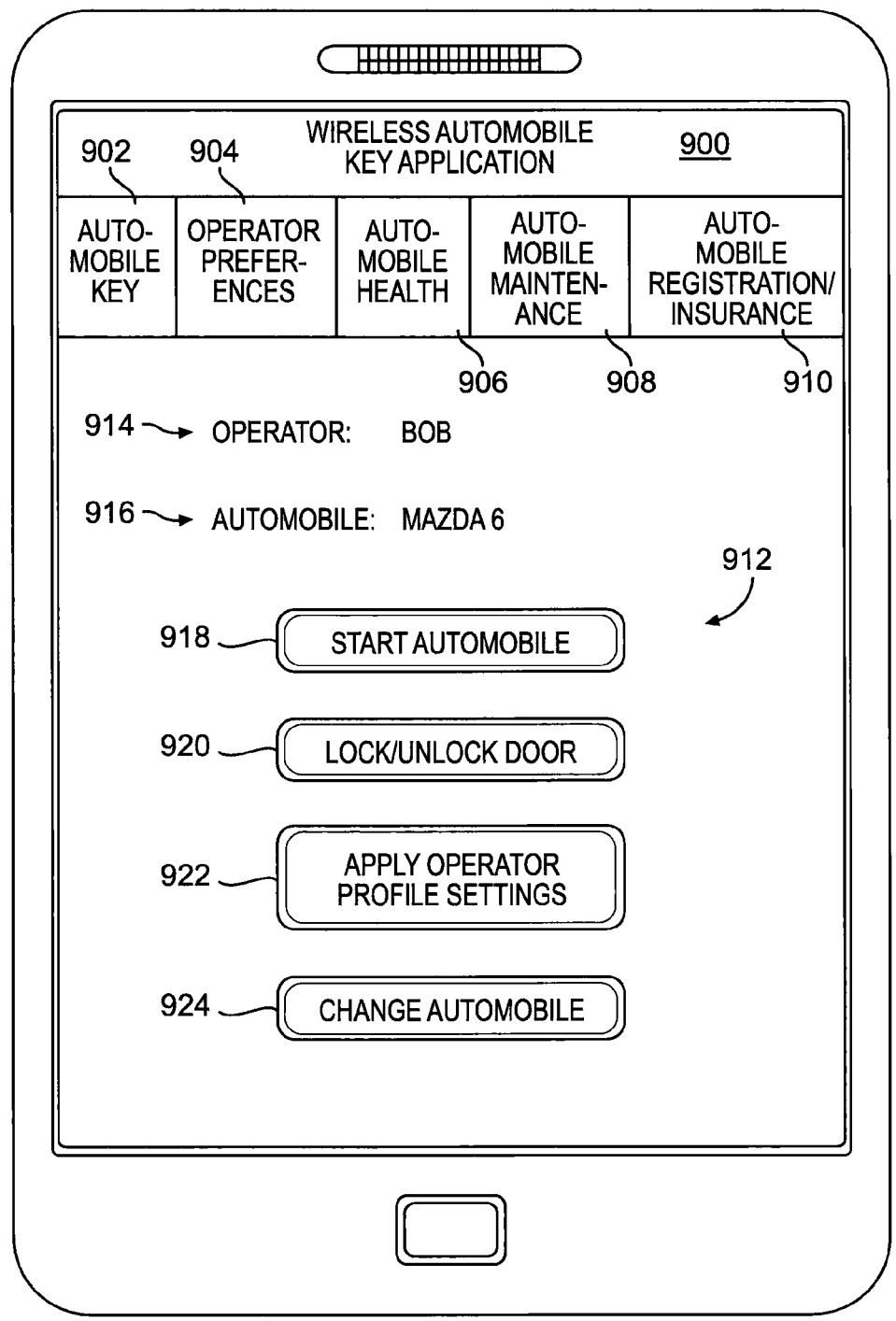
FIG. 9 illustrates an exemplary a page of a wireless automobile key application, or of a wireless automobile key website, consistent with the disclosed embodiments.

FIG. 9 illustrates an exemplary wireless automobile key service page 900. In one embodiment, page 900 may be associated with automobile key service application 302 and displayed to an automobile operator using mobile device 110. In one embodiment, page 900 may be part of automobile security monitoring application 302 and displayed to an automobile operator using mobile device 110. The operator may log in to page 900 by inputting the operator's username, password, biometric data, and/or other authentication information to mobile device 110. Mobile device 110 may then transmit the authentication information, and optionally the mobile ID 304, to automobile service server 118 over cellular network 114. Server 118 may check the provided authentication information against the authentication information 612 corresponding to the mobile ID 610 and/or the operator ID 608 in the stored account information. If server 118 properly authenticates the operator, server 118 may retrieve the operator's profile information 614 and default automobile ID 617 for the operator. In addition, server 118 may retrieve the health information 620, maintenance information 622, registration information, and insurance information 626 for the automobile 112 using the default automobile ID 617. Server 118 may then transmit the retrieved information to mobile device 110 over the Internet 108.

In a second embodiment, page 900 may be a web application associated with the website maintained by web server 120, and may execute in a web browser of mobile device 110 or terminal device 122. For example, the operator may access and log in to the website by inputting the operator's username, password, biometric data, and/or other authentication information to terminal device 122. Terminal device 122 may then transmit the input authentication information server 120 over the Internet. Server 120, in turn, may provide the authentication information to automobile service server 118, which may check the authentication information against the authentication information 612 corresponding to the operator ID 608 in the stored account information. If server 118 properly authenticates the operator, server 118 may retrieve the operator's profile information 614 and default automobile ID 617. In addition, server 118 may retrieve the health information 620, maintenance information 622, registration information 624, and insurance information 626 for the automobile 112 corresponding to the default automobile ID 617. Server 118 may then provide the retrieved information to automobile web service server 120, which may transmit the retrieved information to terminal device 122 over the Internet 108.

As shown in FIG. 9, page 900 may include an automobile key menu user interface (UI) element 902, an operator preferences menu UI element 904, an automobile health menu UI element 906, an automobile maintenance menu UI element 908, and an automobile registration and insurance menu UI element 910. In the example shown, automobile key menu UI element 902 has been selected, causing an automobile key menu 912 to be displayed.

Automobile key menu 912 may include an operator name display 914. Operator name display 914 may convey the name of the automobile operator, for example, as provided by the operator at log-in (e.g., the account username) and/or as indicated by the received operator ID 608.

Automobile key menu 912 may also include an automobile name display 916. Automobile name display 916 may indicate the name of the automobile 112 currently selected for providing the disclosed wireless automobile key service. In one embodiment, automobile name display 916 may initially display the name of the automobile 112 assigned to the operator, as indicated by the received default automobile ID 617. For example, automobile name display 916 may indicate the manufacturer, model, and/or year of manufacture of the operator's automobile. Alternatively, automobile name display 916 may indicate another name for the automobile 112 provided by the operator, for example, while registering for an account with automobile service system 104 (e.g., "Bob's beater").

Automobile key menu 912 may also include a start automobile UI element 918. Start automobile UI element 918 may allow the operator to start the automobile 112 over the Internet 108. For example, in response to the operator providing input to start automobile UI element 918 by, for example, selecting element 918 on a touch screen or with a mouse, mobile device 110 (or terminal device 122) may transmit a start engine command request on cellular network 114 (or on LAN 124). The start engine command request may be received at cellular network gateway 115 (or LAN gateway 126), and transmitted on the Internet 108. Server 118 may receive the start engine command request from the Internet 108. Using the automobile ID 608 and the command ID 630, server 118 may retrieve, from automobile command information 606, the command code 632 corresponding to the engine start command for the operator's automobile 112. Then server 118 may transmit the retrieved command code 632 to the automobile 112 over the Internet 108. Cellular network gateway 115 may receive the command from the Internet 108 and communicate the command onto cellular network 114. Cellular network communication module 404 of automobile 112 may receive the command code 632 from cellular network 114, and may transmit an engine start command containing the received command code 632 on automobile network 420. Finally, engine control module 414 may receive the command from automobile network 402 and, in response, may start the engine of the automobile 112.

Automobile key menu 912 may also include a lock/unlock door UI element 920. Lock/unlock door UI element 920 may allow the operator to lock/unlock a door of the automobile 112 over the Internet 108. For example, in response to the operator providing input to lock/unlock door UI element 920, mobile device 110 (or terminal device 122) may transmit a lock/unlock door command request on cellular network 114 (or LAN 126). The lock/unlock door command may be generated and communicated to the automobile 112 in a similar manner as discussed above with respect to the start automobile command.

Automobile key menu 912 may also include an apply operator profile settings UI element 922. Apply operator profile settings UI element 922 may allow the operator to apply the settings of the operator's profile to the systems of the automobile 112, over the Internet 108. For example, in response to the operator providing input to UI element 922, mobile device 110 (or terminal device 122) may send a corresponding apply operator profile command request on cellular network 114 (or LAN 126). The operator profile command request may be received at cellular network gateway 115 (or LAN gateway 126), and transmitted on the Internet 108. Server 118 may receive the apply operator profile command request from the Internet 108. Using the operator ID 608 and/or the mobile ID 610 corresponding to mobile device 110, server 118 may retrieve from operator information 602 the corresponding profile information 614 for the operator. As discussed above, the operator profile information 614 may identify certain desired settings of the systems of automobile 112. For example, the operator profile information 614 may indicate the operator's desired climate system settings (e.g., 80° F. cabin temperature and high fan speed), desired audio system settings (e.g., 101.1 FM, volume 10, and certain station presets 1-5), desired operator comfort settings (e.g., a certain set position and set seat warmer setting), and desired operator awareness settings (e.g., a certain rearview mirror position and certain side mirror positions).

Based on the desired automobile system settings indicated by the operator profile information 614, automobile service server 118 may retrieve appropriate command codes 632 for these systems from automobile command code information 606. For example, automobile service server 118 may look up appropriate command codes 632 based on the automobile ID 627 and on the command IDs 630 associated with the operator's desired system settings 614. Then, automobile service server 118 may generate one or more commands based on the retrieved command codes 632 to control the automobile systems to achieve the operator's desired settings. Continuing with the example above, server 118 may generate a command to control the climate system to heat the automobile 112 to 80° F. and to set a high fan speed; a command to control the audio system to play 101.1 FM at volume 10, and to apply the operator's desired station presets; a command to control the comfort system to move the driver's seat to the desired position, and to set the seat warmer to high; and a command to control the operator awareness system to move the rearview mirror and side mirror to the desired positioning of the operator.

Server 118 may then transmit the generated command(s) to the automobile 112 over the Internet 108. Cellular network gateway 115 may communicate the command(s) onto cellular network 114. Cellular network communication module 404 of automobile 112 may receive the commands from cellular network 114, and may broadcast corresponding command signals on automobile network 420. The appropriate onboard modules 406-418 may then execute the commands by controlling the onboard systems to achieve the operator's desired settings indicated by the profile information 614.

Operator preferences menu UI element 904 may allow the operator to view and/or change the operator's profile information 614. For example, in response to the operator selecting UI element 904, mobile device 110 (or terminal device 122) may display an operator preference page (not shown) including the previously received operator profile information 614. For example, the operator's climate control system preferences, audio system preferences, comfort system preferences, and/or awareness system preferences may be displayed on the page.

In addition, the page may include one or more UI elements allowing the operator to change the profile information 614. For example, the page may include a UI element allowing the operator to change the operator's climate control system preferences (e.g., cabin temperature), to change the audio system preferences (e.g., station presets), to change the comfort preferences (e.g., seat position), and/or to change the awareness preferences (e.g., mirror and rear camera positions). If any operator preferences are changed, mobile device 110 (or terminal device 112) may send a message to server 118 to update the operator's profile information 614 with the changed preferences.

Automobile health menu UI element 906 may allow the operator to view information regarding the health of the automobile 112. For example, in response to the operator selecting UI element 906, mobile device 110 (or terminal device 122) may display an automobile health menu (not shown) containing the previously received health information 620 associated with the automobile 112. For example, the health menu may display the battery charge level, fuel level, tire pressure, fluid levels, diagnostic alerts, and/or other health information associated with the automobile 112.

Automobile maintenance menu UI element 908 may allow the operator to view information regarding the maintenance of the automobile 112. For example, in response to the operator selecting UI element 908, mobile device 110 (or terminal device 122) may display an automobile maintenance menu (not shown) containing the previously received maintenance information 622 associated with the automobile 112. For example, the maintenance menu may display information regarding any past maintenance performed on the automobile 112 (e.g., oil change on Dec. 6, 2010) and an indication of whether scheduled maintenance is due or overdue.

Similarly, automobile registration and insurance menu UI element 910 may allow the operator to view insurance and registration information associated with the automobile 112. For example, in response to the operator selecting UI element 910, mobile device 110 (or terminal device 122) may display an automobile insurance/registration menu (not shown) containing the previously received registration information 624 and insurance information 626 associated with the automobile 112. For example, the insurance/registration menu may display information indicating the dates during which the automobile insurance and registration are valid. In some embodiments, when an event occurs, such as the operator sending a command to start the engine, system 100 may automatically alert the operator via mobile device 110 if the fuel level is low, the insurance is expired, or automobile 112 is due for maintenance. For example, server 118 may automatically send an alert message (e.g., a text message or e-mail) to mobile device 110 indicating that the fuel level is low, the insurance is expired, the registration is expired, or automobile 112 is due for maintenance. Alternatively, mobile device 110 may automatically display a page showing the insurance information, registration information, and/or maintenance information associated with the automobile 112.

Automobile key menu 912 may also include a change automobile UI element 924. Change automobile UI element 924 may allow the operator to select a different automobile 112 on the wireless automobile key service account. That is, UI element 924 may allow the operator to select an automobile 112 other than the default automobile 112 with which to use the disclosed wireless automobile key service. For example, in response to the operator selecting UI element 924, mobile device 110 (or terminal device 122) may request from server 118 information regarding any other automobiles 112 on the account that the operator is permitted to operate. Server 118 may identify the other available automobiles 112 based on the automobile permission information 612 associated with the operator's ID 608.

Server 118 may then transmit to mobile device 110 (or terminal device 122) the automobile IDs 618 associated with the identified automobiles 112. Then, mobile device 110 (or terminal device 112) may display an automobile selection menu (not shown) allowing the operator to select a new automobile 112 from among the identified automobiles 112. Subsequently, the operator may be able to perform the various automobile key service with respect with the selected new automobile 112. For example, the operator may start the new automobile 112 using UI element 918, may lock/unlock the door of the new automobile 112 using UI element 920, and may apply the preferences indicated in the operator profile information 614 to the systems of the new automobile 112 using UI element 922. In addition, the operator may view and/or change the operator profile information 614 for the new automobile 112 by selecting UI element 904. The operator may also view health information 620, maintenance information 622, registration information 624, and/or insurance information 626 associated with the new automobile 122 by respectively selecting UI elements 906, 908, and 910.

Figure 10:
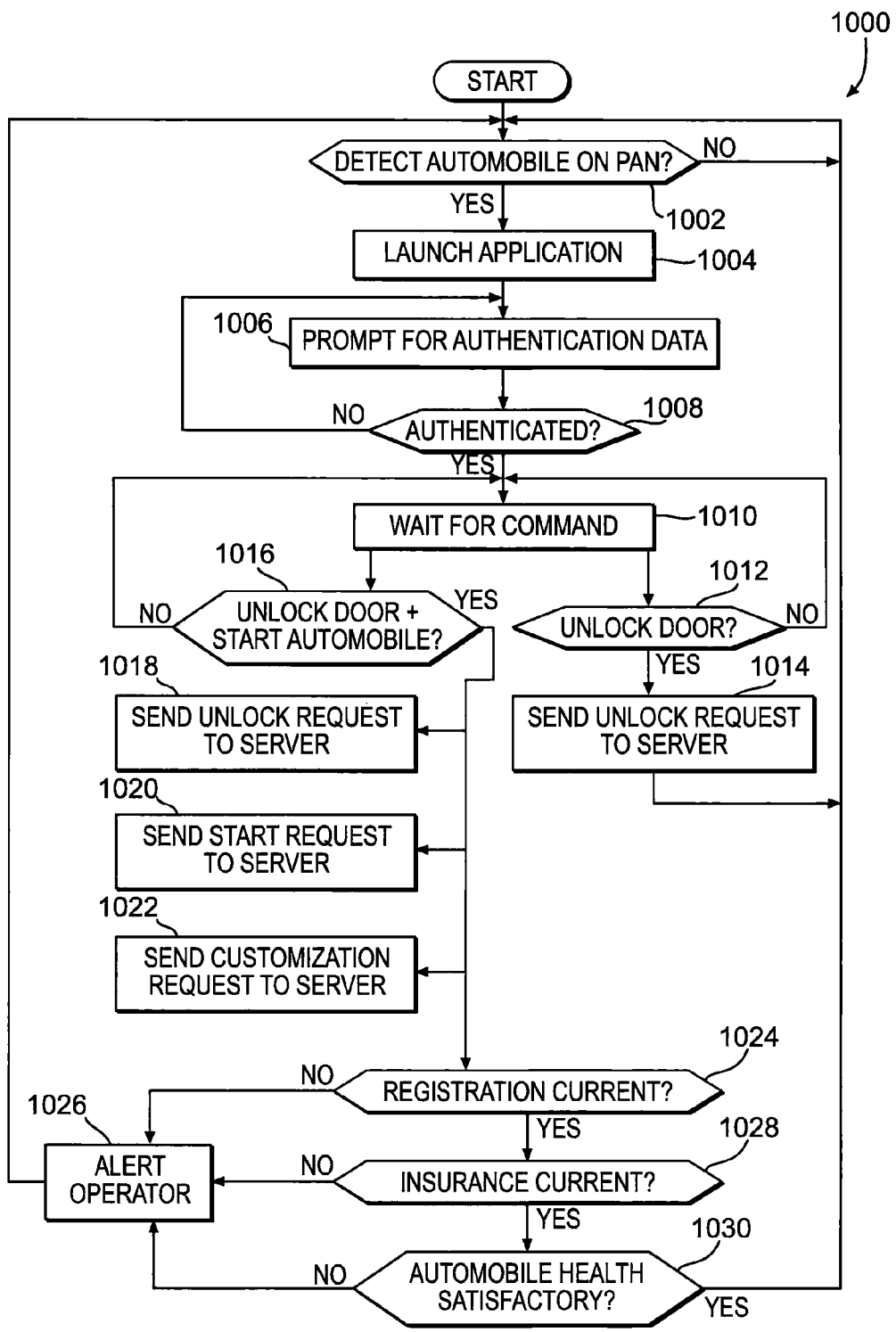
FIG. 10 is a flowchart illustrating an exemplary method for implementing wireless automobile key service, consistent with the disclosed embodiments.

FIG. 10 illustrates a flowchart of an exemplary method 1000 for implementing the disclosed wireless automobile key service, consistent with the disclosed embodiments. In one embodiment, method 1000 may be performed by mobile device 110. For example, processor 202 of mobile device 110, executing instructions stored in memory 204 and/or application 302, may perform method 1000.

In step 1002, mobile device 110 may determine whether automobile 112 is detected on PAN 116. Specifically, mobile device 110 may determine whether PAN communication interface 216 has established a connection, such as a Bluetooth connection, with PAN communication module 402 of automobile 112. In one embodiment, mobile device 112 may detect automobile 112 on PAN 116 if the operator carries mobile device 110 within a certain range of automobile 112 (e.g., 10 meters, 50 meters, etc.). If automobile 112 is not detected on PAN 116, mobile device 110 may wait until automobile 112 is detected on PAN 116. If automobile 112 is detected on PAN 116, mobile device 110 may launch wireless automobile key service application 302, if application 302 is not already running, in step 1004.

In step 1006, using the launched application 302, mobile device 110 may prompt the operator for authentication data. For example, mobile device 110 may display a prompt associated with application 302 requesting that the operator enter the operator's account user name, password, biometric data, and/or other authentication information. Mobile device 110 may then transmit the input authentication to automobile service server 118, over cellular network 114. Server 118 may receive the operator's authentication information from the Internet 108, and may check the received authentication information against the authentication information 612 for the operator corresponding to the operator ID 608 and/or the mobile ID 610. Server 118 may then send a result of the authentication (e.g., successful or unsuccessful) to mobile device 110.

In step 1008, mobile device 110 may determine whether authentication of the operator was successful based on the result returned by server 118. If authentication was unsuccessful, method may return to step 1006, where mobile device 110 may re-prompt the operator for the operator's authentication data. If authentication is successful, however, mobile device 110 may wait for a wireless automobile key command from the operator, in step 1010.

In one example, mobile device 110 may determine whether the operator has input a command request to unlock the door of the automobile 112, in step 1012. For example, after being successfully authenticated, mobile device 110 may display the wireless automobile key service page 900 of application 302. The operator may select the automobile key menu user interface UI element 902 on the page 900, and then select the lock/unlock door UI element 920 from the menu 912. If mobile device 110 determines that the operator has not input a command to unlock the door, method 1000 may return to step 1010, where mobile device 110 may continue to wait for a command from the operator.

If, however, mobile device 110 determines that the operator has input a command to unlock the door of the automobile 112, mobile device 110 may send a request to automobile service server 118 to unlock the door of the automobile 112, in step 1014. Specifically, mobile device 110 may send the request on cellular network 114 via cellular communication interface 214.

Further, mobile device 110 may determine whether the operator has also input a command request to start the automobile 112, in step 1016. For example, the operator may also select the start automobile UI element 918 displayed on the wireless automobile key service page 900. If mobile device 110 determines that the operator has not also input a command request to start the automobile 112, method 1000 may return to step 1010, where mobile device 110 may continue to wait for a command from the operator.

If, however, mobile device 110 determines that the operator has also input a command to start the automobile 112, mobile device 110 may send a request over cellular network 114 to automobile service server 118 to unlock the door of the automobile 112, in step 1018, as described above in connection with step 1014. Moreover, mobile device 110 may send a request over cellular network 114 to server 118 to start the automobile 112, step 1020. In certain embodiments, mobile device 110 may also automatically send a request over cellular network 114 to server 118 to customize the settings of one or more systems of the automobile 112 based on based on the operator's profile, step 1022.

Further, if mobile device 110 determines that the operator has also input a command to start the automobile 112, mobile device 110 may determine whether the registration of the automobile 112 is current, step 1024. In addition, in step 1028, mobile device may determine whether the automobile insurance is current. Further, in step 1030, mobile device 110 may determine whether the automobile health is satisfactory. For example, mobile device 110 may send a request for information regarding the automobile 112 to server 118 over cellular network 114. Sever 118, using the automobile ID 618, may retrieve the health information 620, the maintenance information 622, the registration information 624, and/or the insurance information 626 associated with the automobile 112, and may send the retrieved information to mobile device 110 over the Internet 108.

If mobile device 110 determines that the automobile registration, the automobile insurance, or both are not current, mobile device 110 may alert the operator, step 1026. For example, in one embodiment, mobile device 110 may display the automobile registration/insurance page (not shown) of application 302. On the page, the automobile registration information, the automobile insurance information, or both may be highlighted (e.g., in red) or notated to indicate that the automobile registration, insurance, or both are not current. Alternatively or additionally, mobile device 110 may generate and display a message to the operator indicating that the automobile registration, insurance, or both, are not current. Alternatively or additionally, mobile device 110 and/or server 118 may send a text message or e-mail to an account associated with the operator indicating that the automobile registration, insurance, or both are not current. It is to be appreciated that other methods of alerting the operator are possible and within the scope of the disclosure.

If mobile device 110 determines in step 1030 that the automobile health is unsatisfactory, mobile device 110 may similarly alert the operator. For example, mobile device 110 may determine the automobile health to be unsatisfactory if the battery charge level, the pressure of one or more tires, the fuel level, the oil pressure, fluid levels, etc. are below a threshold.

Figure 11:
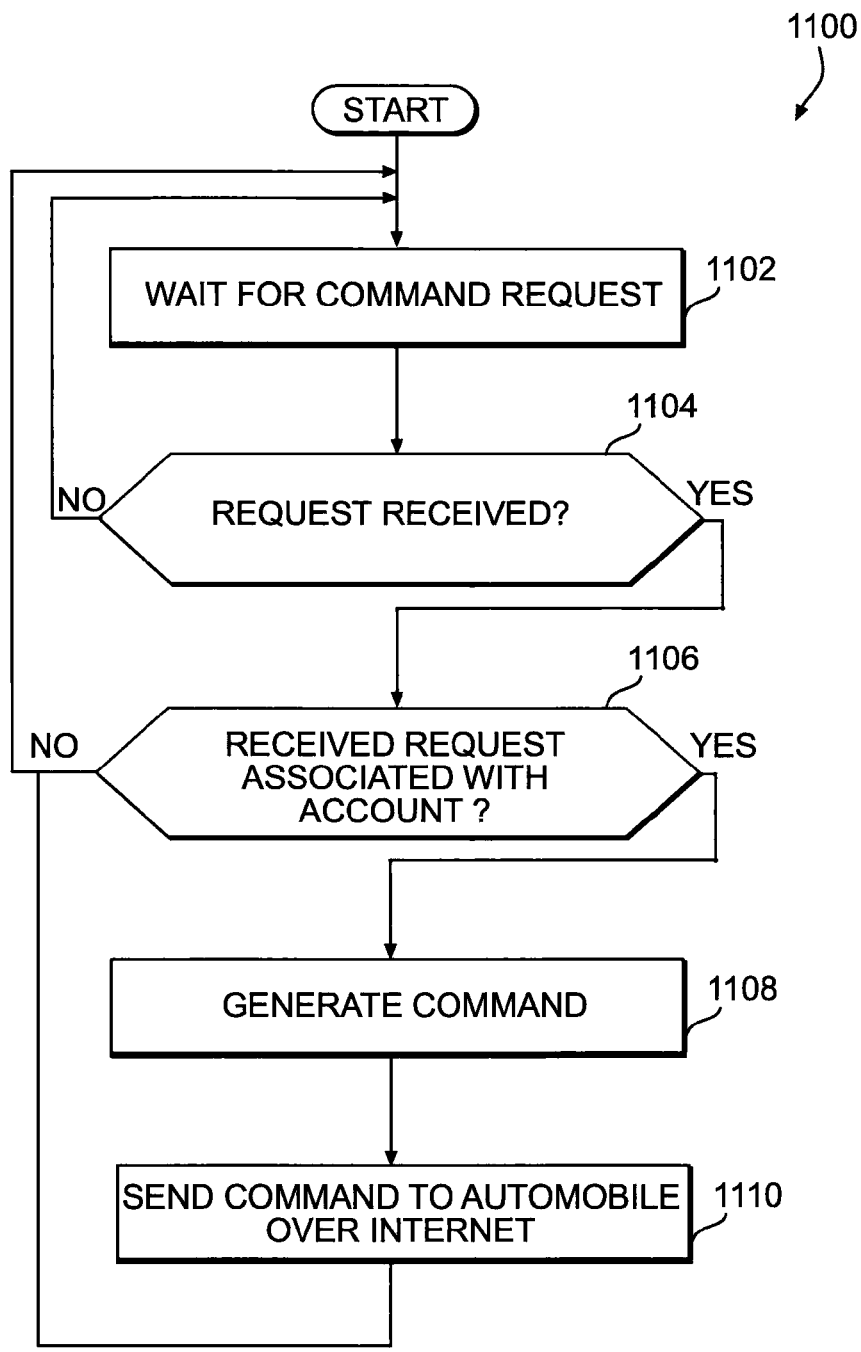
FIG. 11 is a flowchart illustrating an exemplary method for processing wireless automobile key commands, consistent with the disclosed embodiments.

FIG. 11 is a flowchart illustrating an exemplary method 1100 for processing wireless automobile key commands, consistent with the disclosed embodiments. In one embodiment, method 1100 may be performed by server 118. For example, processor 500 of server 118, executing instructions stored in memory 502, may perform method 1100.

In step 1102, server 118 may wait to receive a wireless automobile key command request from a mobile device 110 or from a terminal device 122. For example, server 118 may monitor the Internet 108 via communication interface 512 for a request from a mobile device 110 or a terminal device 122 to unlock the door of an automobile 112, to start the engine of an automobile 112, and/or to customize the settings of one or more systems of an automobile 112 based on an operator profile. In step 1104, server 118 may determine whether such a command request has been received. If a command request has not been received, method 1100 may return to step 1102, where server 118 may continue to wait for a command request.

If server 118 determines in step 1104 that a command request has been received, server 118 may determine whether the received request is associated with a wireless automobile services account, step 1106. For example, in one embodiment, the received command request may include an operator ID (e.g., provided at log-in) associated with the operator making the request, a mobile ID 304 associated with the mobile device 110 from which the request is received, and/or an automobile ID associated with the automobile 112 for which the command is requested. Server 118 may access the account information stored in storage device 506, and determine whether the operator ID, mobile ID, and/or automobile ID associated with the request is found in operator information 602 and/or in automobile information 604. For example, server 118 may determine whether the operator ID, mobile ID, or automobile ID contained in the command request corresponds respectively to an operator ID 608, mobile ID 610, and/or automobile ID 618 associated with an account maintained by automobile service system 104. If server 118 determines that the received command request is not associated with an account, method 1100 may return to step 1102, where server 118 may wait for another command request.

If server 118 determines that the received command request is associated with an account, server 118 may generate a command for the automobile 112, step 1108. For example, server may generate a command to lock/unlock the door of the automobile 112, a command to power on/off the automobile 112, and/or a command to customize the settings one or more systems onboard the automobile 112 based on a profile associated with the operator, as described above.

Then, server 118 may send the command generated in step 1108 to the automobile 112 over the Internet 108, step 1110. Specifically, server 118 may transmit the command on the Internet 108 via communication interface 512. The command may then be received at cellular network gateway 115 and transmitted on cellular network 114. The command may be received at the automobile 112 over cellular network 114 by cellular network communication module 404. Finally, cellular communication module 404 may transmit the command on automobile network 420, and the command may be received and executed by the appropriate module 406-418 onboard the automobile 112.

One of ordinary skill in the art will appreciate that computer programs for implementing the disclosure may be stored on and/or read from computer-readable storage media. The computer-readable storage media may have stored thereon computer-executable instructions which, when executed by a computer processor, cause the computer to perform, among other things, processes disclosed herein. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art. The computer-readable storage media may be embodied by or in one or more components of system 100 (FIG. 1).

While illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosures. The limitations in the claims are to be interpreted broadly based on the language employed in the claims and not limited by examples described in the present specification or during the prosecution of the application. Further, the steps or processes of the disclosure may be modified in any manner, including by reordering steps, inserting steps, deleting steps, or having steps or functions performed by other entities of system 100 (e.g., mobile device 110, servers 118 and 120, and/or terminal device 122), without departing from the principles of the disclosure.

It is intended, therefore, that the specification and examples be considered as exemplary only, with a true scope and spirit of the disclosure being indicated by the following claims and their full scope of equivalents.

What is claimed is:

1. A method for commanding an automobile using a mobile device, comprising:
    connecting the mobile device to the automobile over a first network;
    detecting that the mobile device is connected to the automobile over the first network;
    launching a wireless automobile key service application on the mobile device in response to detecting that the mobile device is connected to the automobile over the first network;
    receiving, via the application from an operator of the automobile using the mobile device, a request to issue a command to the automobile;
    sending, from the mobile device to a server over a second network, a request to issue the command to the automobile over the second network; and
    receiving, at the mobile device from the server over the second network and in response to the command, status information associated with the automobile.

2. The method of claim 1, wherein the first network includes a personal area network (PAN) and the second network includes a cellular network.

3. The method of claim 1, wherein the application is a mobile application configured to execute within a mobile operating environment on the mobile device.

4. The method of claim 1, wherein the command is a command to unlock a door of the automobile or a command to start the automobile.

5. The method of claim 4, further comprising, when the requested automobile command is the command to start the automobile, sending, from the mobile device to the server over the second network, a request to customize settings of at least one system of the automobile based on a profile associated with the operator.

6. The method of claim 5, wherein the at least one system includes at least one of a climate control system, an audio system, an operator comfort control system, and operator awareness control system.

7. The method of claim 1, wherein the status information associated with the automobile includes at least one of automobile health information, vehicle security information, maintenance information, and insurance information.

8. The method of claim 7, further comprising alerting the operator via the mobile device based on at least one of the received automobile health information, vehicle security information, maintenance information, and insurance information.

9. The method of claim 1, wherein receiving the request to issue the command to the automobile includes:
    displaying, on the mobile device, a user interface including at least one user interface element, the user interface element corresponding to the request to issue the command to the automobile; and
    receiving input from the operator via the at least one graphical user interface element.

10. A method for commanding an automobile, comprising:
    connecting the automobile and a communication device to a server via a first network;
    connecting the communication device to the automobile via a second network;
    receiving, by the server over the first network, a request from an operator of the automobile using the communication device to issue a command to start the automobile to the automobile;

identifying an operator profile stored at the server that is associated with the operator, the operator profile defining customized settings of the operator for at least one system of the automobile;

sending, by the server over the first network, a command to the automobile to customize the settings of the at least one system of the automobile based on the operator profile;

sending, by the server over the first network, the command to start the automobile to the automobile; and sending, to the communication device over the first network, status information associated with the automobile.

11. The method of claim 10, wherein the first network includes at least one of a cellular network and the Internet, and the second network includes a personal area network (PAN).

12. The method of claim 11, further including:

determining, by the server and based on at least one of the operator ID, the mobile ID, and the automobile ID, whether the operator, the automobile, or both the operator and the automobile are associated with a wireless automobile key service account; and sending the command to customize or the command to start the automobile only when it is determined that the operator, the automobile, or both the operator and the automobile are associated with a wireless automobile key service account.

13. The method of claim 10, wherein the request includes at least one of an operator ID associated with the operator, a mobile ID associated with the communication device, an automobile ID associated with the automobile, and a command ID associated with the requested automobile command.

14. The method of claim 10, wherein the at least one system onboard the automobile includes at least one of a climate control system, an audio system, an operator comfort system, and operator awareness system.

15. The method of claim 10, wherein receiving the request to issue the command to the automobile includes:

serving a web page to the communication device including at least one user interface element corresponding to the request to issue the automobile command; and receiving, by the server over the first network, an indication of the operator selecting the at least one graphical user interface element.

16. The method of claim 10, wherein the status information associated with the automobile includes at least one of automobile health information, vehicle security information, maintenance information, and insurance information.

17. The method of claim 16, further comprising alerting the operator via the mobile device based on at least one of the automobile health information, vehicle security information, maintenance information, and insurance information.

18. An automobile service system for commanding an automobile using a communications device, comprising:

a communications interface for communicating with the automobile and the communications device over a first network, wherein the communications device connects to the automobile over a second network;

a storage device storing an operator profile associated with an operator of the automobile and defining customized settings of the operator for at least one system of the automobile; and one or more processors configured to:

receive, via the communications interface over the first network, a request from the operator of the automobile to issue a command to start the automobile to the automobile;

identify, responsive to receiving the request, the stored operator profile;

send, via the communications interface over the first network, a command to the automobile to customize the settings of the at least one system of the automobile based on the identified operator profile; and send, via the communications interface over the first network, the command to start the automobile to the automobile.

19. The automobile service system of claim 18, wherein the first network includes at least one of a cellular network and the Internet, and the second network includes a personal area network (PAN).

20. The automobile service system of claim 18, wherein the request includes at least one of an operator ID associated with the operator, a mobile ID associated with the communication device, an automobile ID associated with the automobile, and a command ID associated with the requested automobile command.

21. The automobile service system of claim 20, wherein:

the storage device further stores wireless automobile key service account information, and the one or more processors being further configured to:

determine, based on the stored wireless automobile key service account information and on at least one of the operator ID, the mobile ID, and the automobile ID, whether the operator, the automobile, or both the operator and the automobile are associated with a wireless automobile key service account; and send, via the communications interface over the first network, the command to customize or the command to start the automobile only when it is determined that the operator, the automobile, or both the operator and the automobile are associated with a wireless automobile key service account.

22. The automobile service system of claim 18, wherein the status information associated with the automobile includes at least one of automobile health information, vehicle security information, maintenance information, and insurance information.

23. A mobile device configured to command an automobile, comprising:

an input device;

a memory storing an application program;

a first communication interface connecting the mobile device to the automobile over a first network;

a second communication interface connecting the mobile device to a server over a second network; and one or more processors configured to:

detect that the mobile device is connected to the automobile over the first network via the first communication interface;

launch the application program on the mobile device in response to detecting that the mobile device is connected to the automobile over the first network;

receive, via the input device, a request to issue a command to the automobile;

send, from the mobile device to a server over a second network via the second communication interface, a request to issue the command to the automobile over the second network; and receive, at the mobile device over the second network via the second communication interface and in response to the command, status information associated with the automobile.

24. The mobile device of claim 23, wherein the first network includes at least one of a cellular network and the Internet, and the second network includes a personal area network (PAN).

* * * * *